(12) United States Patent
Todokoro et al.

(10) Patent No.: US 6,699,386 B2
(45) Date of Patent: Mar. 2, 2004

(54) ENDOTOXIN ADSORBENT, AND A METHOD OF REMOVING ENDOTOXIN BY USING THE SAME

(75) Inventors: Masami Todokoro, Kumamoto (JP); Chuichi Hirayama, Kumamoto (JP); Masashi Kunitake, Kumamoto (JP); Masayo Sakata, Kumamoto (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 10/085,005

(22) Filed: Mar. 1, 2002

(65) Prior Publication Data
US 2002/0130082 A1 Sep. 19, 2002

(30) Foreign Application Priority Data
Mar. 14, 2001 (JP) ......................................... 2001-072011

(51) Int. Cl.[7] ............................................... B01D 15/08
(52) U.S. Cl. ................. 210/198.2; 210/263; 210/502.1; 210/506; 210/635; 210/656; 502/402; 502/404
(58) Field of Search ................................. 210/635, 656, 210/679, 791, 198.2, 263, 502.1, 506; 502/401, 402, 404

(56) References Cited

U.S. PATENT DOCUMENTS

| 4,946,953 A | * 8/1990 | Okuma et al. ................. 536/57 |
| 5,064,950 A | * 11/1991 | Okuma et al. ................. 536/57 |
| 5,169,535 A | * 12/1992 | Adachi et al. ............... 210/669 |
| 5,237,016 A | * 8/1993 | Ghosh et al. ............. 525/329.4 |
| 5,279,821 A | 1/1994 | Hirayama et al. .......... 210/679 |
| 5,346,889 A | * 9/1994 | Tsuchiya et al. .............. 514/21 |
| 5,578,455 A | * 11/1996 | Tosa et al. ................. 435/7.32 |
| 6,207,066 B1 | * 3/2001 | Trese et al. ................. 210/806 |
| 6,315,907 B1 | * 11/2001 | Hirai et al. ............... 210/679 |

OTHER PUBLICATIONS

Bulletin of the Chemical Society of Japan, No. 8, pp. 726–730 (1994).

Journal of Liquid Chromatography & Related Technologies, 23(12), 1887–1902 (2000).

Abstract of Japan Patent No. 01127039 published May 19, 1989.

Abstract of Japan Patent No. 16843/1994 published Mar. 1994.

* cited by examiner

Primary Examiner—Ernest G. Therkorn
(74) Attorney, Agent, or Firm—McDermott, Will & Emery

(57) ABSTRACT

This invention provides an adsorbent having a high ability to adsorb endotoxin selectively and a method of adsorbing endotoxin. The adsorbent comprises a basic substance bonded to a base material by means of a crosslinking agent.

9 Claims, 2 Drawing Sheets

Measurement of the exclusion limit mol. wt.

ENDOTOXIN ADSORBENT, AND A METHOD OF REMOVING ENDOTOXIN BY USING THE SAME

FIELD OF THE INVENTION

This invention relates to an endotoxin adsorbent and a method of removing endotoxin by using the same, and in particular to an endotoxin adsorbent whose exclusion limit molecular weight has been controlled and a method of removing endotoxin by using the same.

BACKGROUND OF THE INVENTION

The term endotoxin is a generic name of toxic substances present in microbial components in microorganisms and released after the microorganisms perish. A structural component of endotoxin is a lipopolysaccharide produced in microorganisms living in a production process and mixed in pharmaceutical preparations after the microorganisms perish. Known methods of removing endotoxin include a method of using an adsorbent such as charcoal or an ion exchanger, a filtration method of using a membrane or a membrane filter, and a degradation method of using high temperature/high pressure treatment or an acid or alkali. Any methods have both advantages and disadvantages and are problematic for industrial use. For example, removal of endotoxin in production of pharmaceutical preparations cannot be conducted under severe conditions because of the necessity for maintaining the stability of original pharmaceutical preparations, and even if endotoxin can be adsorbed successfully in laboratories, endotoxin cannot be satisfactorily adsorbed in the industrial scale or pharmaceutical preparations themselves are adsorbed because of a very small amount of occurring endotoxin, and thus the conventional methods are not necessarily satisfactory.

On the other hand, some adsorbents have been proposed in recent years in order to enable endotoxin adsorption which is also satisfactory in industry. Japanese Patent Publication No. 16843/1994 discloses an adsorbent made of polyamino acid containing a modifying group having an aliphatic group and/or an aryl group at the terminal of a side chain and/or main chain thereof, and Japanese Patent Laid-Open No. 127039/1989 discloses an adsorbent comprising an imidazole derivative bonded to spherical particles of polyamino acid as carriers.

Further, Bulletin of the Chemical Society of Japan, No. 8, pp. 726–730 (1994) has reported the results of a study on the endotoxin-adsorbing ability of an adsorbent comprising polyethylene-imine fixed by using a crosslinking agent onto cellulose fibers.

In addition, J. LIQ. CHROM. & REL. TECHNOL., 23(12), 1887–1902 (2000) has reported the results of a study on the adsorbability of an endotoxin adsorbent using N,N-dimethylaminopropyl acrylamide, N-propylene acrylamide or N,N'-butylene-bis-methacrylamide (BBMA) as a base material and divinyl benzene as a crosslinking agent.

However, these adsorbents are poor in selectivity for removing only endotoxin from solutions such as endotoxin-containing pharmaceutical preparations or blood containing proteins at high concentration, and there is the problem that acidic proteins which should not be adsorbed are adsorbed together with endotoxin.

SUMMARY OF THE INVENTION

In view of the problems in the prior art described above, the present inventors made extensive study. As a result, they found that an adsorbent with a controlled exclusion limit molecular weight comprising a specific basic substance bonded to a specific base material by means of a crosslinking agent, has a high ability to adsorb endotoxin selectively, and this adsorbent can be used to remove endotoxin highly selectively from solutions such as endotoxin-containing pharmaceutical preparations or blood containing proteins at high concentration, and on the basis of this finding, this invention have been completed.

That is, this invention encompasses:

(1) an endotoxin adsorbent with an exclusion limit molecular weight of 6000 or less as determined by polysaccharide standards, which comprises a basic substance bonded to a base material by means of a crosslinking agent;

(2) the endotoxin adsorbent according to the above-mentioned (1), wherein the base material is a polysaccharide selected from cellulose, agarose, chitosan, chitin, starch and mannan, a derivative of said polysaccharide, a polymer of a monomer selected from acrylamide, methacrylamide, acrylic acid, acrylate, methacrylic acid, methacrylate, vinyl acetate, vinyl chloride, styrene and an allyl compound, or a copolymer of two or more of these monomers;

(3) the endotoxin adsorbent according to the above-mentioned (1), wherein the base material is a polysaccharide selected from cellulose, agarose, chitosan, chitin, starch and mannan, a derivative of said polysaccharide, a polymer of a monomer selected from acrylic acid, acrylate, methacrylic acid, methacrylate, vinyl acetate, vinyl chloride, styrene and an allyl compound, or a copolymer of two or more of these monomers;

(4) the endotoxin adsorbent according to the above-mentioned (1), wherein the base material is cellulose or a derivative thereof;

(5) the endotoxin adsorbent according to any one of the above-mentioned (1) to (4), wherein the base material is porous cellulose or a derivative thereof having an exclusion limit molecular weight of 6000 or less as determined by saccharide standards;

(6) the endotoxin adsorbent according to any one of the above-mentioned (1) to (4), wherein the base material is porous cellulose or a derivative thereof having an exclusion limit molecular weight of 2000 or less as determined by saccharide standards;

(7) the endotoxin adsorbent according to the above-mentioned (1), wherein the basic substance is at least one member selected from ε-poly-L-lysine, α-poly-L-lysine, poly-histidine, poly-arginine, poly-tryptophan, polyornithine, poly-2,4-diaminobutyric acid, poly-2,3-diaminopropionic acid, protamine, polyallylamine, an allylamine-diallylamine copolymer, polydiallylamine, polyvinylamine, polymyxin, streptomycin, amikacin, and kanamycin.

(8) the endotoxin adsorbent according to the above-mentioned (1), wherein the basic substance is ε-poly-L-lysine or α-poly-L-lysine;

(9) the endotoxin adsorbent according to the above-mentioned (1), wherein the crosslinking agent is at least one crosslinking agent selected from hexamethylene diisocyanate, m-xylene diisocyanate, toluene-2,4-diisocyanate, diglycidyl ether, epichlorohydrin and halogenated epichlorohydrin; and

(10) a method of removing endotoxin, which comprises using an endotoxin adsorbent described in any one of the above-mentioned (1) to (9).

DETAILED DESCRIPTION OF THE INVENTION

Figure 1:
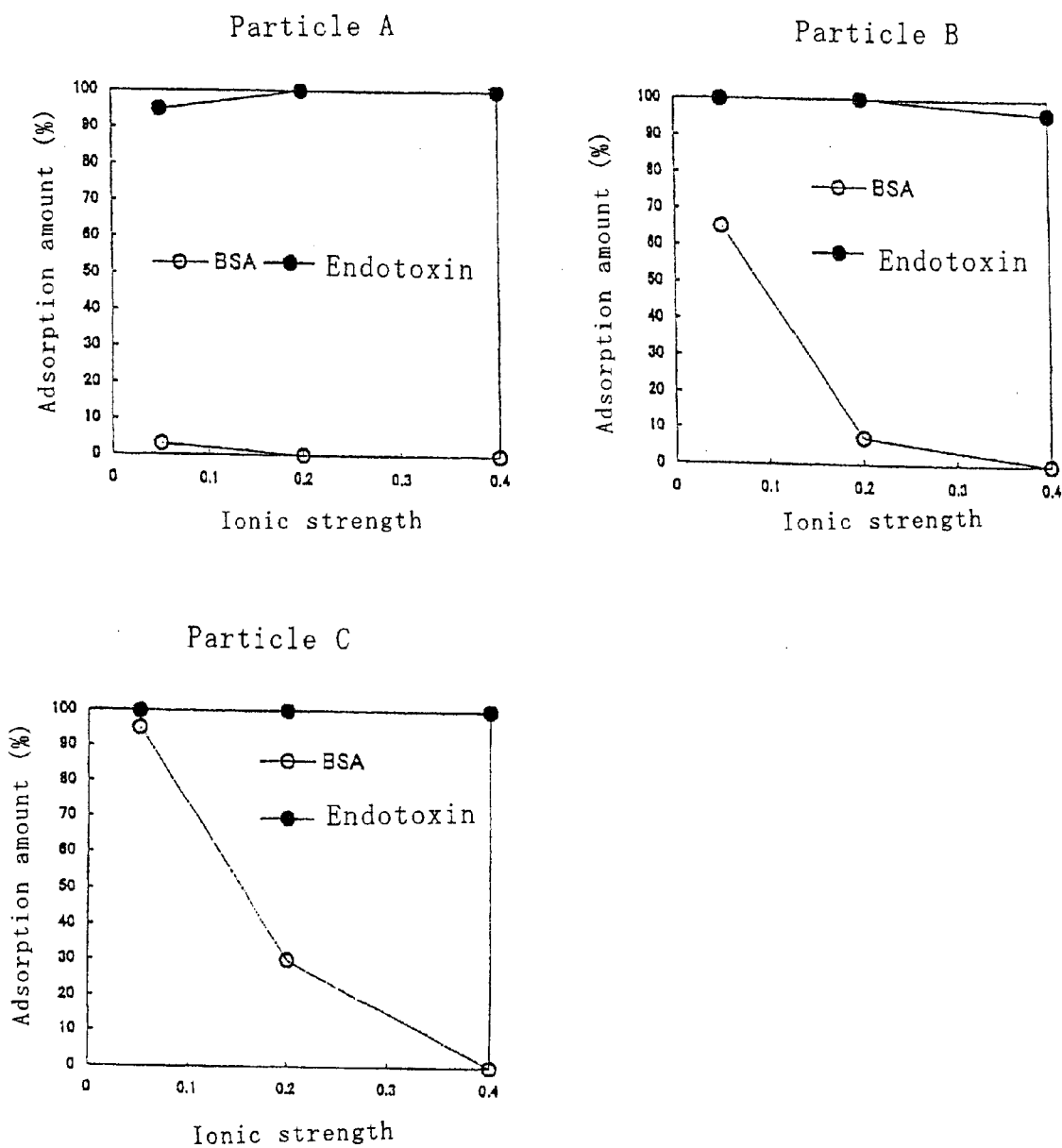
FIG. 1 is a graph showing comparison among the adsorbents obtained in the Example and Comparative Examples in adsorptivity of BSA and endotoxin.

Hereinafter, the present invention is described in detail.

The base material used in the endotoxin adsorbent of the invention includes polysaccharides such as cellulose, agarose, chitosan, chitin, starch and mannan, derivatives thereof, polymers of monomers such as acrylamide or analogues thereof, methacrylamide or analogues thereof, acrylic acid or analogues thereof, methacrylic acid or analogues thereof, vinyl analogues, allyl analogues, or derivatives thereof, or copolymers of two or more of these monomers, preferably polysaccharides such as cellulose, agarose, chitosan, chitin, starch and mannan, derivatives thereof, polymers of monomers such as acrylamide or analogues thereof, methacrylamide or analogues thereof, vinyl analogues, allyl analogues, or derivatives thereof, or copolymers of two or more of these monomers. In particular, the base material is preferably cellulose or a derivative thereof, more preferably porous cellulose having an exclusion limit molecular weight of 6000 or less as determined by saccharide standards, most preferably porous cellulose or a derivative thereof having an exclusion limit molecular weight of 2000 or less as determined by saccharide standards.

The endotoxin adsorbent of this invention is an adsorbent whose exclusion limit molecular weight has been controlled, preferably an adsorbent comprising a basic substance bonded to a base material by means of a crosslinking agent, particularly preferably an adsorbent comprising a basic substance bonded to water-insoluble carriers as the base material by means of a crosslinking agent for easier production.

The exclusion limit molecular weight of an adsorbent refers to the molecular weight of a substance not capable of penetrating into pores of the adsorbent, and can be determined from the elution positions of substances of known molecular weight passed through a column packed with the adsorbent. The substances of known molecular weight include saccharides such as monosaccharide, disaccharide, oligosaccharide and pullulan and synthetic molecules such as polyethylene glycol and polyethylene oxide. Globular proteins are also used as substances of known molecular weight to determine the exclusion limit molecular weight. The exclusion limit molecular weight is usually changed depending on the type of measured substances of known molecular weight, and this change occurs depending on whether their molecular form is linear or globular. Accordingly, the exclusion limit molecular weight determined by using saccharide standards is different from the exclusion limit molecular weight determined by using protein standards.

The water-insoluble carrier is a carrier made of a water-insoluble material or a material rendered water-insoluble by subjecting a water-soluble material to treatment such as crosslinking reaction, and examples thereof include the same materials as the base materials described above, for example polysaccharide gels made of agarose, dextran, cellulose, chitosan, chitin, starch or mannan and crosslinked materials thereof, as well as synthetic polymers such as polyvinyl alcohol and polyacrylamide.

The base material used in this invention is not particularly limited and may be in any forms of spherical particles, hollow fibers and membrane, but spherical particles can be preferably used in this invention because they are easily produced and handled.

The base material in the form of follow fibers refers to a fibrous base material having continuous or discontinuous pores in it, and the pores have been formed therein by adding a foaming agent to a spinning dope or by using e.g. a special spinneret.

The base material in the form of a membrane, similar to a commercial membrane filter, is flat and porous with a predetermined range of exclusion limit molecular weight.

The porous cellulose particles, agarose particles and chitosan particles are commercially produced, easily available, and preferably usable in this invention. Further, the cellulose particles are of high mechanical strength, utilizable as an adsorbent in the industrial scale, and particularly preferably usable in this invention.

The method of producing such base materials is not particularly limited, and is described by reference to a method of producing spherical cellulose particles.

As shown in e.g. Japanese Patent Laid-Open No. 86749/1978, cellulose acetate is dissolved in an organic solvent, and this solution is suspended in an aqueous medium whereby the cellulose acetate is rendered spherical, and the organic solvent is evaporated whereby cellulose ester particles are obtained, and the resulting particles are saponified and formed into cellulose particles. The porous spherical cellulose particles preferably used in this invention can be thus obtained.

The base material used in this invention is a porous base material preferably having an exclusion limit molecular weight of preferably 6000 or less, more preferably 2000 or less, as determined by saccharide standards.

The basic substance used in this invention is at least one member selected from condensates of amino acids having a basic group in a side chain thereof, such as $\epsilon$-poly-L-lysine, $\alpha$-poly-L-lysine, poly-histidine, poly-arginine, poly-tryptophan, polyornithine, poly-2,4-diaminobutyric acid and poly-2,3-diaminopropionic acid, synthetic polymers such as protamine, polyallylamine, an allylamine-diallylamine copolymer, polydiallylamine and polyvinylamine, and basic antibiotics such as polymyxin, streptomycin, amikacin, and kanamycin.

The condensates of amino acids having a basic group, which can be used preferably as the basic substance in this invention, include $\epsilon$-poly-L-lysine. The $\epsilon$-poly-L-lysine is produced by culturing microorganisms of the genus Streptomyces and is advantageous in that it can be produced at a lower cost than that of $\alpha$-poly-L-lysine produced through organic synthesis. As the method of producing the $\epsilon$-poly-L-lysine, a method described in Japanese Patent Publication No. 20359/1984 can be exemplified. That is, $\epsilon$-poly-L-lysine can be obtained by culturing *Streptomyces albulus* in a culture medium containing glycerol, ammonium sulfate, yeast extract etc. and subsequent separation and purification thereof.

The basic substance can be bonded to the base material by means of a crosslinking agent having a reactive functional group in a method known in the art. To bond primary to tertiary amino groups contained in the basic substance to the base material, it is preferable to employ an epoxy compound as the crosslinking agent having a reactive functional group because the basic substance as ligand is strongly covalently bonded to the base material so that the basic substance as the ligand is hardly separated when the resultant adsorbent is used for removal of endotoxin.

Specifically, the method of bonding the basic substance to the base material by using the epoxy compound includes a method of reacting the base material with bisoxysilane or epichlorohydrin to introduce epoxy groups and reacting these epoxy groups with primary to tertiary amino groups in the basic substance, a method of reductively fixing primary amino groups in the basic substance onto aldehyde groups formed by oxidizing diol moieties of the base material with periodic acid, a method of epoxylating the base material with epichlorohydrin, aminating the product and reacting it with succinic anhydride to introduce a carboxyl group, or of epoxylating the base material, then reacting it with an aminocarboxylic acid to introduce a carboxyl group, followed by condensing this terminal carboxyl group with a primary amino group in the basic substance, and a method of reacting the base material to which a carboxyl group was introduced in the method described above, with N-hydroxysuccinimide to form an active type (N-hydroxysuccinimide ester) which is then bonded to an amino group in the basic substance.

The crosslinking agent used in the crosslinking reaction of the basic substance includes, but is not limited to, at least one crosslinking agent selected from bifunctional compounds such as hexamethylene diisocyanate, m-xylene diisocyanate and toluene-2,4-diisocyanate; compounds having two epoxy groups such as diglycidyl ether; epichlorohydrin; and halogenated epichlorohydrin. Epichlorohydrin can be particularly preferably used for easier reaction. A preferable reaction method and reaction conditions in the crosslinking reaction should be selected for each crosslinking agent used, but generally the reaction can be conducted with stirring in an inert dispersant or by suspension polymerization of the basic substance with the crosslinking agent in an aqueous solution. The amount of the crosslinking agent added, though not particularly limited, is 1 to 100 mole %, preferably 5 to 50 mole %, more preferably 2 to 10 mole %.

The method of selectively removing endotoxin from an endotoxin-containing liquid by using the endotoxin adsorbent of the invention is not particularly limited. This method is particularly effective in removal of endotoxin from a solution containing proteinous components at high concentration, such as removal of endotoxin from blood or in the final step for pharmaceutical preparations. The specific mode therefor includes, but is not limited to, a batch method wherein the endotoxin adsorbent of the invention is washed with a suitable buffer and added to an endotoxin-containing solution, and then the mixture is stirred and subjected to e.g. filtration to separate and remove the adsorbent, and a column method wherein the endotoxin adsorbent of the invention is charged into a column and washed with a suitable buffer, and then an intended solution such as a pharmaceutical preparations or blood containing endotoxin is passed therethrough, and eluting fractions are recovered to separate and remove the endotoxin. In a more preferable mode, the column method is integrated into the final process of purification.

In a preferable mode, endotoxin is removed from blood in therapy by circulation outside the body wherein just before return to the patient body, blood removed from the patient body or plasma components separated from blood corpuscles are passed through a column packed with the endotoxin adsorbent of the invention, and the blood or plasma components from which endotoxin was removed are returned to the patient body.

EXAMPLES

Hereinafter, this invention is described in more detail by reference to the Example and Comparative Examples, which however are not intended to limit this invention. Method of measuring the exclusion limit molecular weight A sample to be measured is charged into a column with an inner diameter of 0.8 cm and a length of 30 cm and equilibrated with deionized water, and 10 $\mu$l molecular-weight saccharide standards dissolved at a concentration of 5 mg/ml in deionized water are injected into the column. The elution volumes of the standards are determined at a flow rate of 1 ml/min. with a differential refractometer as a detector to prepare a graph showing the elution position of each standard plotted against the molecular weight thereof, and on the basis of this graph, the exclusion limit molecular weight is determined.

Example 1

100 g (wet weight) spherical cellulose particles having an exclusion limit molecular weight of about 1000 as determined by saccharide standards were suspended in 200 ml deionized water and heated to 30° C. under stirring, and 60 ml of 20 wt. % aqueous NaOH was added to the suspension, and the mixture was stirred for 1 hour. Then, 60 g of epichlorohydrin was added thereto, and the mixture was allowed to react for 2 hours under stirring. After the reaction was finished, the reaction mixture was filtered and washed with water until the filtrate became neutral. To 100 g (wet weight) of the epoxy-activated cellulose particles thus obtained were added 90 ml deionized water and 30 ml of 25 wt. % $\epsilon$-poly-L-lysine solution (average molecular weight of 4,700, produced by Chisso Corporation), and the mixture was allowed to react at 45° C. for 2 hours under stirring. After the reaction was finished, the reaction product was washed with water to give an endotoxin adsorbent (referred to hereinafter as "particles A").

Comparative Example 1

An endotoxin adsorbent (referred to hereinafter as "particles B") was obtained in the same manner as in Example 1 except that spherical cellulose particles having an exclusion limit molecular weight of about 10000 as determined using saccharide standards were used.

Comparative Example 2

An endotoxin adsorbent (referred to hereinafter as "particles C") was obtained in the same manner as in Example 1 except that spherical cellulose particles having an exclusion limit molecular weight of about 2000000 as determined using saccharide standards were used.

1. Experiment of Selectively Removing Endotoxin

Each of the endotoxin adsorbents prepared in the Example and Comparative Examples was weighed, and 0.2 g (wet weight) endotoxin adsorbent was introduced into a 10-mL Erlenmeyer flask. Then, 2 ml phosphate buffer, pH 7 (whose ionic strength was regulated with common salt) containing 100 ng/ml E. coli-derived endotoxin (LPS manufactured by Wako Pure Chemical Industries, Ltd.) and 500 $\mu$g/ml bovine serum albumin (BSA) was added thereto and incubated at 30° C. for 2 hours. After incubation, the supernatant was sampled and filtered through a 0.45 $\mu$m membrane filter, and the filtrate was measured for its endotoxin concentration. Measurement of endotoxin was conducted using a commercial kit (Limulus ES-II Test Wako, produced by Wako Pure Chemical Industries, Ltd.).

The particles C having a large pore size (particles obtained in Comparative Example 2) tended to adsorb BSA significantly at low ionic strength, thus failing to remove endotoxin. The particles B obtained in Comparative Example 1 adsorbed BSA in a lower amount than by the particles C, but the adsorption of BSA was still nearly 70 wt. % at an ionic strength of 0.2 or less, and thus endotoxin could not be removed. The particles A obtained in Example 1 scarcely showed adsorption of BSA even at lower ionic strength, thus enabling selective removal of endotoxin.

2. Measurement of the Exclusion Limit Molecular Weight of each Adsorbent

Figure 2:
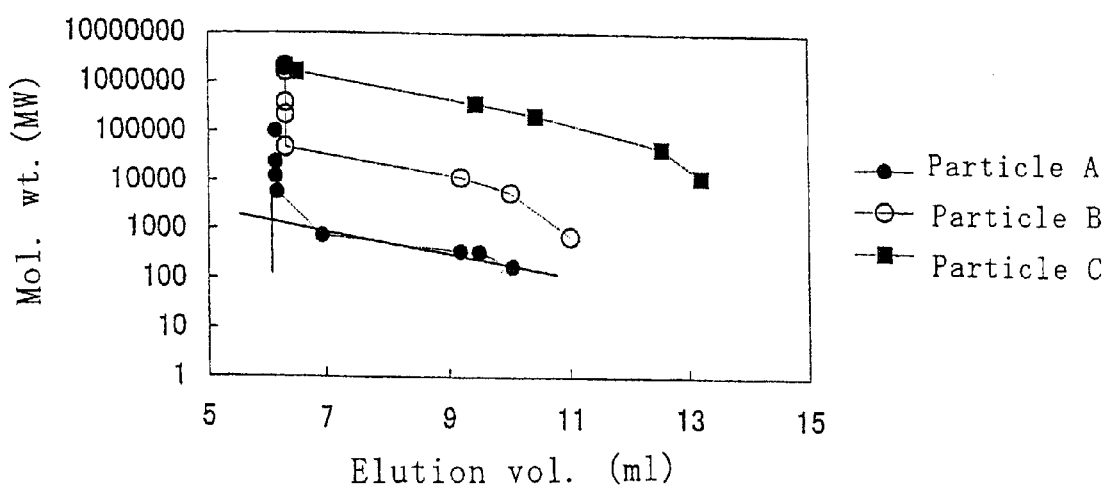
FIG. 2 shows a graph showing the results of measurement of the exclusion limit molecular weights of the adsorbents obtained in the Example and Comparative Examples.

The exclusion limit molecular weights of particles A, B and C were determined by the above-described method of measuring exclusion limit molecular weight. The results are shown in FIG. 2. As can be seen from FIG. 2, the elution volume of standards having molecular weights of 6000 or more from particles A does not change, indicating that those standards having molecular weights of 6000 or more cannot be diffused into particles A, and from the point of intersection shown in the graph, the exclusion limit molecular weight thereof was determined to be about 2000. The exclusion limit molecular weights of particles B and C determined in the same manner were about 48000 and 2000000, respectively.

Industrial Applicability

The adsorbent of the invention has a high ability to adsorb endotoxin, and can remove endotoxin highly selectively from a high-conc. protein solution and blood containing endotoxin.

What is claimed is:

1. An endotoxin adsorbent with an exclusion limit molecular weight of 6000 or less as determined by polysaccharide standards, which comprises a basic substance bonded to a base material by means of a crosslinking agent.

2. The endotoxin adsorbent according to claim 1, wherein the base material is a polysaccharide selected from cellulose, agarose, chitosan, chitin, starch and mannan, a derivative of said polysaccharide, a polymer of a monomer selected from acrylamide, methacrylamide, acrylic acid, acrylate, methacrylic acid, methacrylate, vinyl acetate, vinyl chloride, styrene and an allyl compound, or a copolymer of two or more of these monomers.

3. The endotoxin adsorbent according to claim 1, wherein the base material is a polysaccharide selected from cellulose, agarose, chitosan, chitin, starch and mannan, a derivative of said polysaccharide, a polymer of a monomer selected from acrylic acid, acrylate, methacrylic acid, methacrylate, vinyl acetate, vinyl chloride, styrene and an allyl compound, or a copolymer of two or more of these monomers.

4. The endotoxin adsorbent according to claim 1, wherein the base material is cellulose or a derivative thereof.

5. The endotoxin adsorbent according to any one of claims 1 to 4, wherein the base material is porous cellulose or a derivative thereof having an exclusion limit molecular weight of 6000 or less as determined by saccharide standards.

6. The endotoxin adsorbent according to any one of claims 1 to 4, wherein the base material is porous cellulose or a derivative thereof having an exclusion limit molecular weight of 2000 or less as determined by saccharide standards.

7. The endotoxin adsorbent according to claim 1, wherein the basic substance is at least one member selected from ε-poly-L-lysine, α-poly-L-lysine, poly-histidine, poly-arginine, poly-tryptophan, polyornithine, poly-2,4-diaminobutyric acid, poly-2,3-diaminopropionic acid, protamine, polyallylamine, an allylamine-diallylamine copolymer, polydiallylamine, polyvinylamine, polymyxin, streptomycin, amikacin, and kanamycin.

8. The endotoxin adsorbent according to claim 1, wherein the basic substance is ε-poly-L-lysine or α-poly-L-lysine.

9. The endotoxin adsorbent according to claim 1, wherein the crosslinking agent is at least one crosslinking agent selected from hexamethylene diisocyanate, m-xylene diisocyanate, toluene-2,4-diisocyanate, diglycidyl ether, epichlorohydrin and halogenated epichlorohydrin.

* * * * *